April 22, 1924.
D. TURNER
1,490,994
CONTINUOUS MEASURING MACHINE
Filed July 22, 1919    6 Sheets-Sheet 1
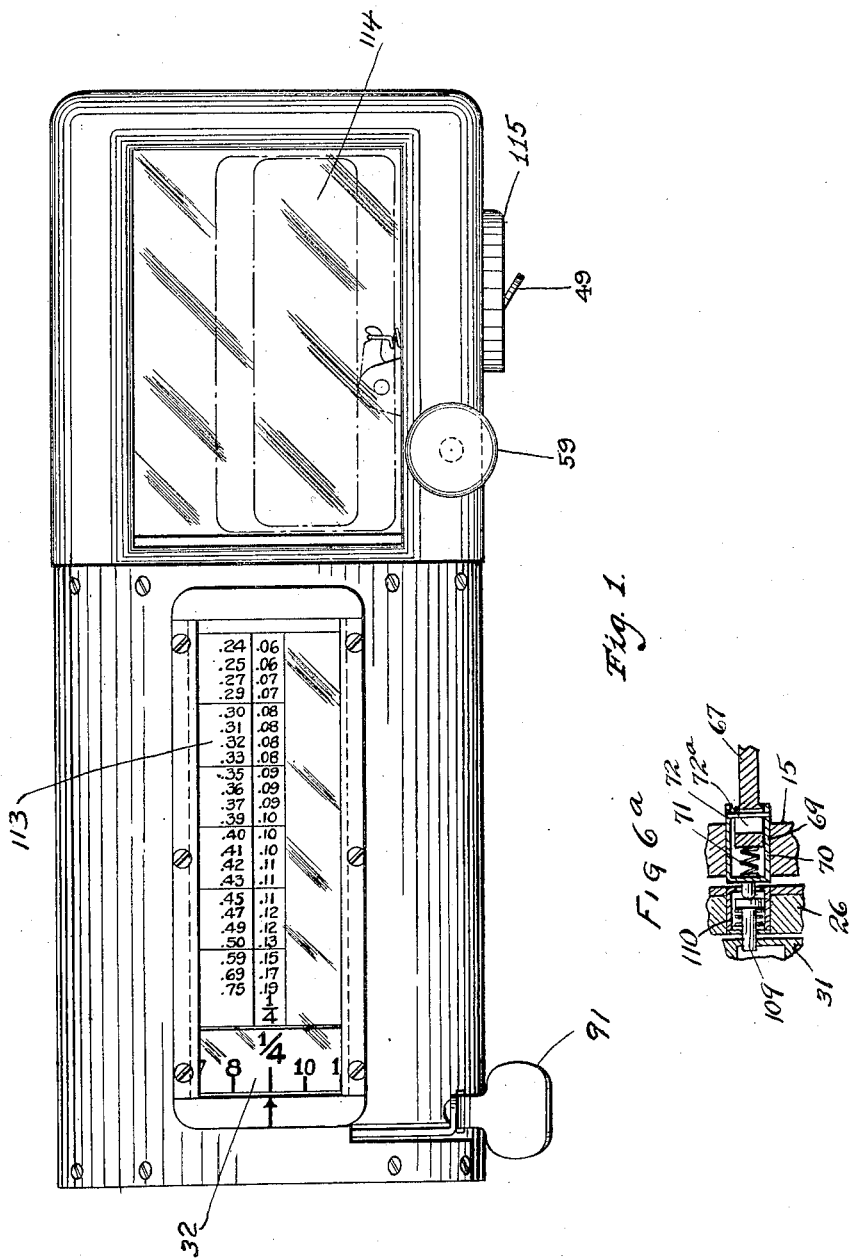

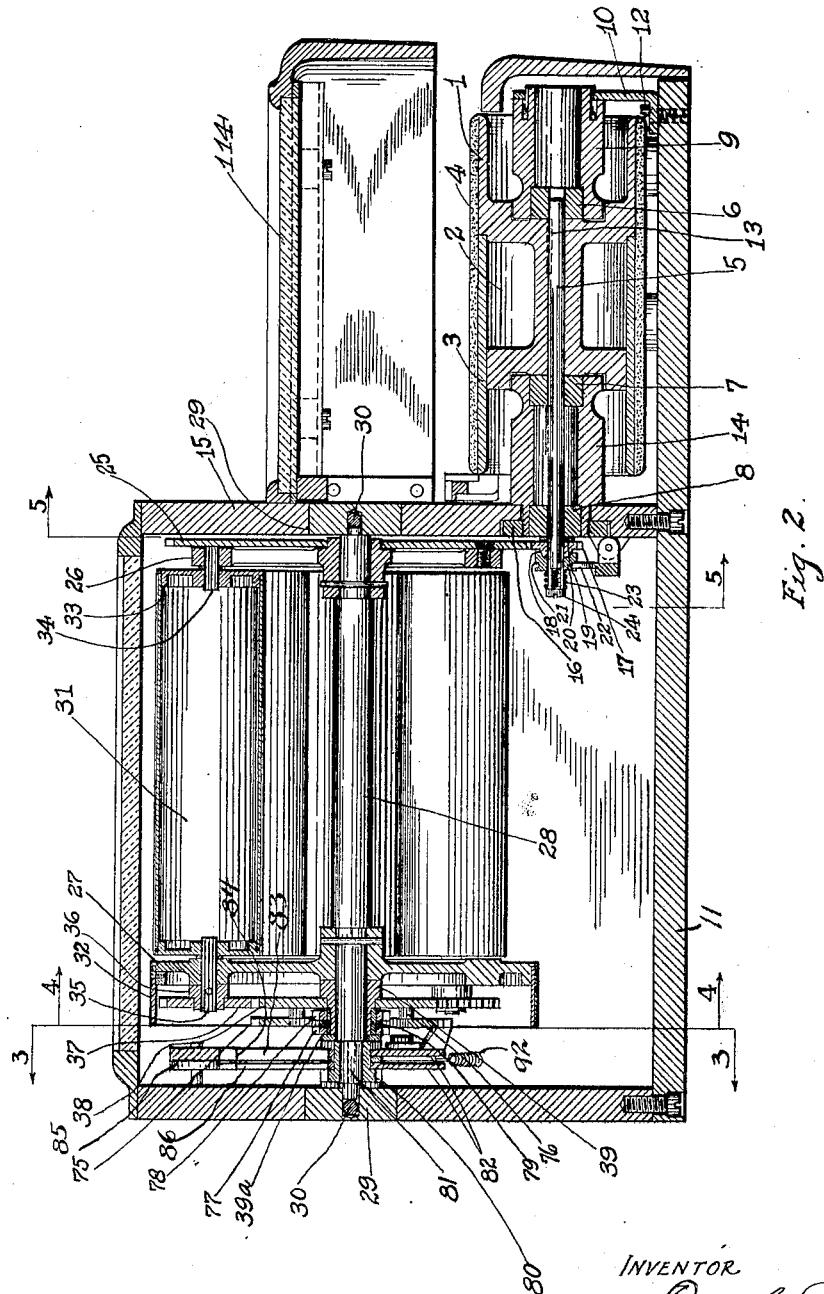

April 22, 1924.

D. TURNER 1,490,994

CONTINUOUS MEASURING MACHINE

Filed July 22, 1919  6 Sheets-Sheet 3

INVENTOR.
Douglas Turner
BY
ATTORNEYS

April 22, 1924.

D. TURNER 1,490,994

CONTINUOUS MEASURING MACHINE

Filed July 22, 1919        6 Sheets-Sheet 4

INVENTOR
Douglas Turner
By
ATTORNEYS

April 22, 1924.

D. TURNER 1,490,994

CONTINUOUS MEASURING MACHINE

Filed July 22, 1919    6 Sheets-Sheet 5

INVENTOR
Douglas Turner
By
James Sheridan Swift
ATTORNEYS

April 22, 1924.

D. TURNER 1,490,994

CONTINUOUS MEASURING MACHINE

Filed July 22, 1919    6 Sheets-Sheet 6

INVENTOR
Douglas Turner
BY
ATTORNEYS

Patented Apr. 22, 1924.

1,490,994

UNITED STATES PATENT OFFICE.

DOUGLAS TURNER, OF ST. LOUIS, MISSOURI, ASSIGNOR TO THE MEASUREGRAPH COMPANY, OF ST. LOUIS, MISSOURI, A CORPORATION OF DELAWARE.

CONTINUOUS MEASURING MACHINE.

Application filed July 22, 1919. Serial No. 312,633.

*To all whom it may concern:*

Be it known that I, DOUGLAS TURNER, a citizen of the United States, residing at St. Louis, State of Missouri, have invented certain new and useful Improvements in Continuous Measuring Machines, of which the following is a specification.

My invention relates to improvements in machines for measuring the length of material. It is embodied in the present case in a machine for measuring and indicating the computed price of cloth, ribbon, or other textile fabrics, although not limited to such use.

The type of fabric measuring machine now used most extensively comprises a pair of rollers between which the fabric is drawn by the operator, one of the rollers being connected to the hands of a dial and also to a pair of price indicating charts. The dial indicates the number of yards being drawn through the machine, up to the capacity of said machine and the charts which travel past an opening indicate the price for the particular yardage at any one of a number of prices per yard. The charts are wound from one spool or roller onto another against the action of a spring, and being of a definite length, the capacity of the machine is thereby limited. At the end of the measuring operation, the spring rewinds the charts and restores the other parts as well to normal position. In order to measure a length of goods greater than the capacity of the machine, it is necessary to restore the pointer and the charts to zero and then continue drawing the goods between the rollers, this cycle of operation being repeated as many times as is necessary.

The starting and stopping of the machine in this manner entails additional operations, and for other reasons also it is objectionable.

The general object of the present invention is to provide an improved machine which may be operated continuously in the same direction and the indicating parts of which may be reset to zero position by a limited movement without having to retravel the distance traversed in taking the measurement; also to provide an automatic stop controlled by the position of the presser roller, operating to permit the free rotation of the reel in the measuring movement and operating automatically to arrest the reel in its zero position in the resetting movement.

Contributory objects are, to provide continuously rotatable length indicating and price indicating charts, the latter traveling faster than the former past the sight opening because of the greater number of figures thereon, whereby corresponding length and price indications are visible to the operator at the same time; to provide means for compactly arranging the price indicating tables whereby the latter, which require a very large superficial area, may be housed in a small casing but arranged to present a continuous succession of figures at the reading point or sight opening; to provide a construction wherein the return spring of prior machines is eleminated, thereby relieving the measuring rollers from the additional tension occasioned by the spring and resulting not only in a machine which operates more freely, but which relieves delicate fabrics from an unnecessary stress in pulling them through the machine; to provide a machine which may be reset to zero position instantaneously; to provide a machine in which the mechanism above the measuring rollers is eliminated, whereby the operator is enabled to inspect said rollers through a suitable opening when the goods are passing through the machine and notice when threads or ravelings become wound around the rollers; and, to provide a machine of generally simplified construction which lends itself to economical manufacture.

Further objects and uses will be apparent from the description which follows.

Referring to the drawings,

Figure 1 is a top plan view of a machine which embodies this invention;

Fig. 2 is a vertical longitudinal section through the center of the machine with the presser roll omitted;

Figure 6:
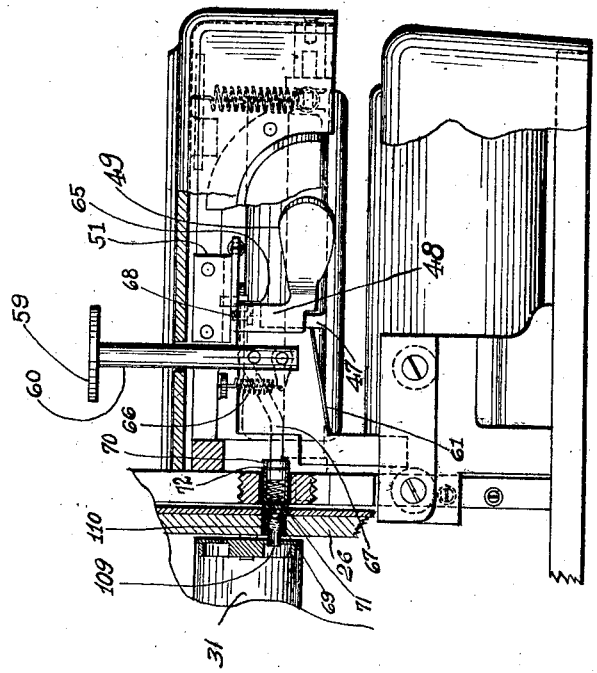
Figure 6 is a fragmentary elevation and partial vertical section through the machine and showing the automatic stop in vertical section.
Figures 7, 8:
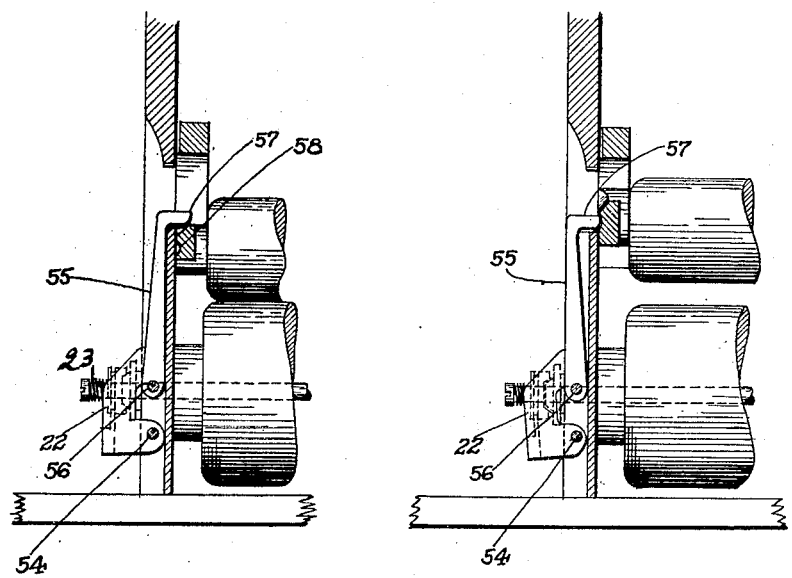
Figure 9:
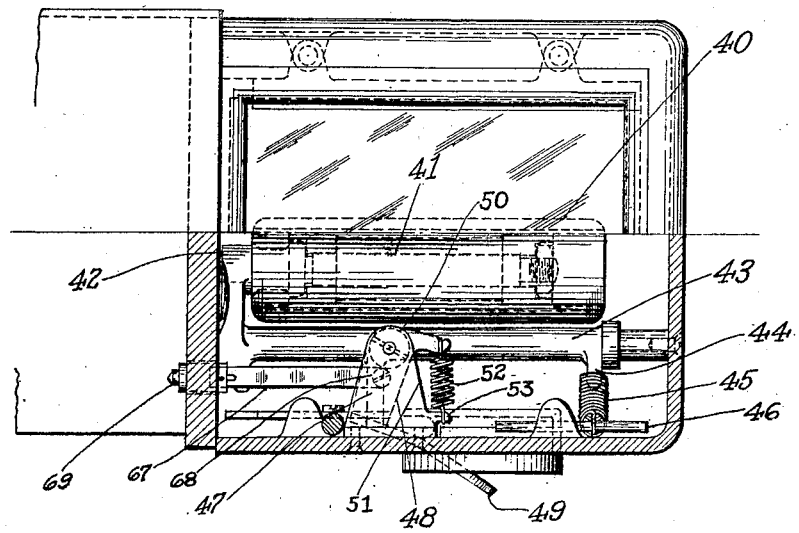

Figure 6ª is a vertical section through a part of the automatic stop mechanism but upon an enlarged scale;

Fig. 7 is a partial sectional elevation of the end of said measuring rolls showing the clutch mechanism;

Fig. 8 is a similar view with said mechanism in a different position when the rolls are separated;

Fig. 9 is a plan view of the measuring rolls and adjuncts, part of the casing being broken away;

Fig. 10 represents the development of one of the price indicating cylinders; and Fig. 11 represents the development of the length indicating scale.

The measuring roll or power roll 1 as shown in Fig. 2, is of light construction, being hollowed out to form an annular chamber 2, which is closed by a cylindrical shell 3, said roll having a cylindrical covering 4, which consists preferably of carborundum or other substance suitable for frictional contact with the fabric which is being measured. The measuring roll is mounted of a shaft 5 which is preferably of small diameter to reduce friction, said shaft turning in bearings 6, 7 and 8. Bearing 6 is mounted in the tubular housing 9 which in turn is supported by the bracket 10 attached to the base plate 11 by screws 12 or other suitable fastening means. Said measuring roll is fixed to the shaft 5 by means of a spline 13. The bearing 7 is carried in the tubular housing 14 supported by the vertical plate 15, being attached thereto by means of a nut 16. Said housing 14 also carries at its inner end the bearing 8.

A friction clutch may be provided for driving the indicating means from the measuring roller. For this purpose a pinion 17 is loosely mounted on the measuring roll shaft 5 and has a conical projection 18 constituting one member of a friction clutch, said pinion being adjacent to a collar 19 on the shaft 5, either integral therewith or secured thereto by suitable means, said collar being provided to take up the end thrust of the clutch. The female member 20 of said friction clutch is non-rotatably connected to said shaft 5 in any suitable manner, and is provided with an annular groove 21 which receives the yoke 22 employed to throw the members of the clutch into and out of frictional engagement with each other. I prefer to control this clutch automatically. For this purpose a coiled spring 23 surrounds the end of the shaft between the screw 24 and said clutch member 20 and tends normally to hold the parts in frictional engagement. When the female member 20 is moved to the left, however, against the action of the spring, the pinion 17 will turn freely on the shaft 5, whereas when the clutch members are in engagement, said pinion is fast on said shaft.

The pinion 17 meshes with a gear 25, said gear being mounted on a spider 26. Said spider and a second spider 27 are non-rotatably mounted on a shaft 28, the latter having reduced ends which are mounted in suitable hard steel bushings 29 and provided with hardened steel balls 30 to reduce end friction. Said spiders carry the rotary indicators or price indicating cylinders 31 of which there are preferably eight. The spider 27 also carries the length indicating scale 32. The cylinders 31 are provided with end hubs 33 carrying trunnions 34 and 35, the latter carrying at the outer ends hubs 36 to which are rigidly secured pinions or gears 37. These pinion mesh with a larger gear 38, the latter being carried on a hub 39 to which it is non-rotatably secured. Said hub may turn freely on the shaft 28 but both the hub and the gear carried thereby are normally stationary, being locked against rotation by means hereinafter described. It will be seen that the arrangement described provides a planetary gear system whereby the outer gears or planetary gears are caused to roll around the central gear or sun gear when the spider is rotated, the individual cylinders 31 being caused to travel in a circular path in addition to rotating about their individual axes.

The machine being intended primarily to measure cloth and the like, the unit of measurement is the yard and eighths of a yard, the periphery of the measuring roll 1 is preferably one-eighth of a yard in length, and the ratio of the gears 17 and 25 is 1 to 8, whereby the measuring roll rotates eight times in measuring one yard of cloth, the cage, made up of the two spiders, indicating cylinders, and their adjuncts, making one revolution during said measurement. The ratio of the diameter of the planet gears 37 to the sun gear 38 is such that as the indicating cylinders complete one revolution, each cylinder has in addition advanced one-tenth of a revolution beyond its initial position. The outer surface of each cylinder comprises a chart having printed thereon calculated figures which are functions of the length measured, representing the charges to be made for the goods at different price rates per yard. In Fig. 10 the development of one of the cylinders is shown having all the calculated values for $\frac{1}{8}$, $1\frac{1}{8}$, $2\frac{1}{8}$, etc. yards, up to and including $9\frac{1}{8}$ yards, there being ten rows of figures thereon. The next cylinder adjacent thereto in a clockwise direction would have the values for $\frac{2}{8}$, $1\frac{2}{8}$, $2\frac{2}{8}$ etc. yards, and those of the next cylinders $\frac{3}{8}$, $1\frac{3}{8}$, $2\frac{3}{8}$, etc. yards. The last cylinder will indicate values for $\frac{8}{8}$, $1\frac{8}{8}$, $2\frac{8}{8}$, etc. yards. The machine is thus arranged for a computing capacity of 10 yards to correspond with the decimal system, thereby facilitating ready computation when measuring lengths longer than the initial capacity of the machine. Since the planetary gears are adapted to rotate indefinitely about the sun gear, the capacity of the machine is unlimited, although after 10 yards have been measured, the cycle of operations automatically repeats, and it is necessary for the operator to remember the total number of cycles performed. It is apparent, however, that suitable means may be employed to register the total number of cycles up to any desired limit.

The means for moving the upper roller or pressure roller 40 into and out of engagement with the lower roller or measuring roller 1, will now be described. (See Figs. 6 and 9.) This roller is mounted on a suitable shaft 41, the latter being secured to an arm 42 at the left hand end of a rocker shaft 43. Said rocker shaft is provided with a projection 44 to which a spring 45 is secured, the other end of said spring being secured to a support 46 carried by the casing. Said spring tends to maintain a yielding pressure of the upper roller against the lower roller. In order to introduce the goods to be measured between said rollers, however, it is necessary to hold them apart against the action of said spring when the machine is not in use. For this purpose an arm 47 is provided on said rocker shaft which engages a notch in a pivoted starting lever or latch 48, the outer end of said lever constituting a starting button 49. Said lever which in plan view (Fig. 9), is a bell crank lever, is pivoted on the screw stud 50, the latter being carried in a bracket 51. Said bell crank lever 48 is normally held in the position shown by a spring 52 secured to its short arm and to a projection 53 on the bracket 51. As shown in Fig. 6, the upper roll is locked in uppermost position by the starting lever 48. When the starting button 49 thereon is pressed by the operator, the notched portion of said lever moves to the right, thereby permitting the arm 47 to snap upwardly and the roller 40 to snap downwardly under the influence of the spring 45.

This downward movement serves also to engage the clutch members 18, 20, Fig. 2, previously described. The yoke 22, Fig. 7, is pivoted at the point 54 and is arranged to be rocked by the lever 55 which is pivoted at 56. The upper end of said lever is turned inwardly at 57, and normally engages in a recess 58, (see Figs. 7 and 8,) when the upper roller is separated from the lower roller. When said upper roller is lowered, the projection 57 rides out of said recess, as shown in Fig. 7, thereby permitting the lever 55 and the yoke 22 to rock to the right, permitting the frictional engagement of the clutch members by force of spring 23. When the rolls are separated, as hereinafter described, the clutch is disengaged, the parts moving from the positions shown in Fig. 7 to those shown in Fig. 8.

The arrangement is such that when the operator places the cloth to be measured between the measuring rollers, which are normally separated when the machine is not in use, he holds one end of the cloth with his right hand, allowing the thumb to press inwardly the starting button 49, whereupon the rollers are brought together with the goods between them and the frictional clutch becomes effective to connect the roller 1 to the length and price indicating charts. The cloth is then drawn between the rollers, the length indicating chart shown in Fig. 11 revolving comparatively slowly so that the figures thereon may be readily observed, whereas the price indicating charts 31 pass the line of vision much more rapidly until the measurement has been completed, at which time both charts being stationary, the length and price at any price per yard may be readily observed. The operator then marks the goods to indicate the exact end of the measurement, this marking being accomplished preferably by cutting a slit in the edge of the goods with a knife.

Figure 5:
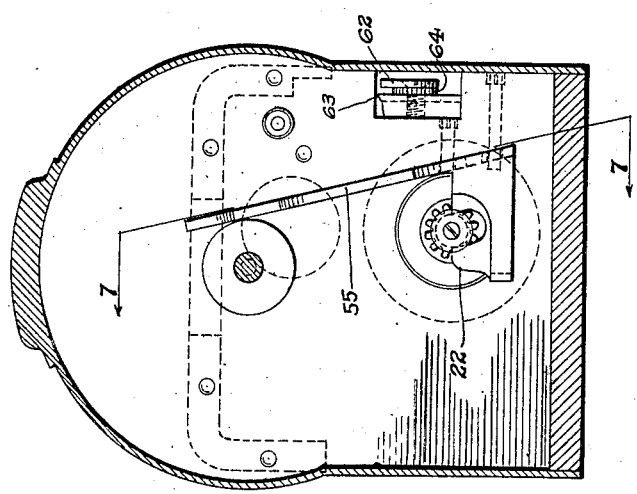
Fig. 5 is a section on the line 5—5 of Fig. 2.

In carrying out this operation, the operator depresses the button 59, Fig. 6, thereupon lowering the stem 60 and the knife blade 61 secured to the lower end thereof striking the arm 47, and simultaneously raising the upper roller to release the goods and disengage the clutch. Said blade, as it descends, is received between a pair of shear blades 62, 63, Fig. 5, spaced apart by a washer 64, one of said blades cooperating with the upper blade to act as a shear and the other blade acting as a guide. The upper shear blade also carries a projection 65, Fig. 6, arranged to engage the arm 47 on the rocker shaft 43, so that when the notching button is depressed against the action of a spring 66, said shaft will be rocked, the upper roller will be raised, and the clutch members disengaged.

I provide automatic stop mechanism which is preferably controlled automatically by the position of the presser roller frame, so that when the presser roller frame is down, and holding the presser roller against the measuring roller then the automatic stop permits the free and continuous rotation of the reel; but when the presser roller frame is raised then the automatic stop comes into active operation and stops the reel at the zero position in the resetting movement.

The operation of the starting button 49 by the operator serves also to move to the right a link 67 secured thereto by a screw 68 and having a loose connection at its other end with the plunger 69. (see Figs. 6, 6ᵃ and 9). Said plunger is enlarged to form a hollow cylinder 70 having a spring 71 therein, connection between said cylinder and said link being provided by a pin 72. This plunger assists in locking the rotating cylinders in normal position as hereinafter explained.

When the lever or latch 48 is held in its extreme position toward the right, the link 67 holds the cylinder or stop pin 70 in a withdrawn position so that it permits free rotation of the reel. In the other position of the latch 48, namely, the position illustrated in Figure 6, if the reel is not in the zero position, the movement of the plunger 69 will compress the spring 71 and the force of this spring will hold the cylinder or stop 70 against the end face of the reel. As soon as the opening in the spider 26 arrives opposite this stop, the spring 71 will shove the end of the pin 70 into the spider and thereby arrest the reel in the zero position.

Figure 4:
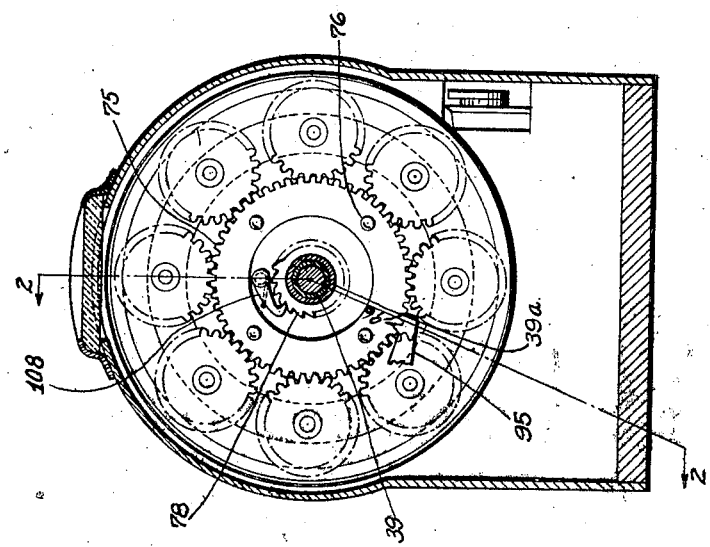
Fig. 4 is a section on the line 4—4 of Fig. 2.

The means for restoring the rotating cage and the indicating cylinders to zero position will now be described. The sun gear 38 Fig. 2 mounted on the hub 39 carries a second gear 75 having a large central opening as shown in Fig. 4, and spaced from said first gear by rivets 76. Within the space provided by said opening are the gear 77 and the ratchet 78, both secured to a second hub 39$^a$, said gear and ratchet being spaced apart by a suitable collar 79.

Figure 3:
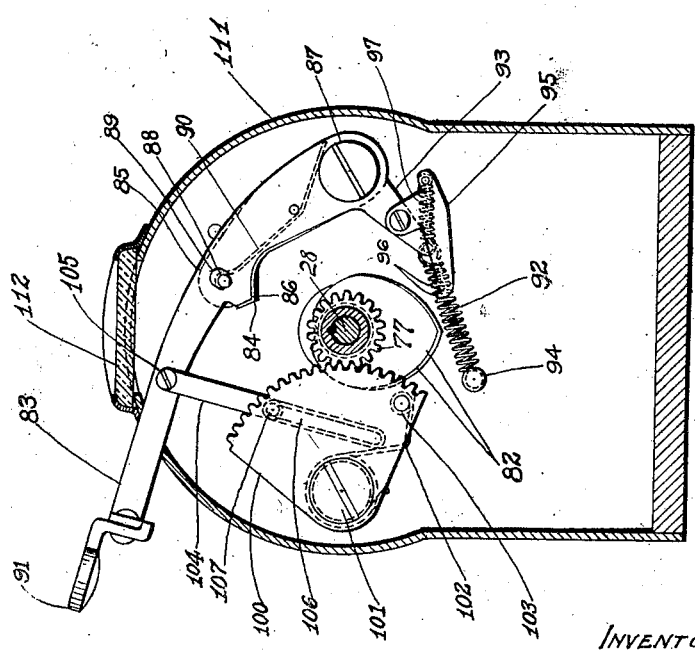
Fig. 3 is a section taken on the line 3—3 of Fig. 2.

An additional hub 80 is also rigidly secured to the shaft 28, by spline 81. Said hub carries two heart-shaped cams 82 spaced apart slightly. Said heart-shaped cams are used to restore the cage to initial position by the following means, (see Fig. 3). A resetting lever 83 has a pointed projection 84 thereon arranged to engage the periphery of one of said heart cams. A second lever 85 is arranged adjacent said first lever and has a similar point 86. Both of said levers are pivoted on the stud 87. The lever 85 carries a pin 88 which projects through the slot 89 in the lever 83, said lever being impelled downwardly by a spring 90, said movement being limited, however, by the length of said slot. The lever 83 has a button 91 at its outer end, which is depressed by the operator to restore the parts to initial position, this operation serving to cause the points 84, 86, to engage the heart shaped cams 82, thereby restoring the latter to initial position. Two points and two cams are provided, slightly offset with reference to each other, to insure movement one way or the other and avoid accidental locking on a dead center. The lever 83 is normally held in uppermost position as shown by means of a spring 92 Fig. 3, secured to the end of an extension 93 on said lever and to a pin 94. Said extension also carries a pawl 95, pivoted thereon, having two locking teeth 96 at the end which are impelled inwardly by the spring 97 to engage the teeth of the gear 75 Fig. 4, thereby normally locking the same against rotation. When the operator depresses the lever 83, said teeth are withdrawn said gear is unlocked and is free to rotate. Said rotation is effected by means of a sector 100 Fig. 3, which is pivoted at the point 101 and is normally pressed upwardly by the spring 102 which engages a pin 103 thereon. Said sector is in mesh with the teeth of the gear 77 and is operated by a link 104 secured by the screw stud 105 to the lever 83 and having a slot 106 at its other end through which passes a pin 107 mounted in the sector 100. When the operator depresses the lever 83 the sector is oscillated, thereby rotating the gear 77 and rotating also the ratchet 78 in such a direction that said ratchet rides under the spring pawl 108 without rotating the sun gear 38 to which said ratchet is secured. During the upward movement of the lever 83, however, the sector is actuated by its spring, thereby turning said gear and ratchet in the opposite direction and rotating the larger gear or sun gear 38, this movement being imparted to the several planetary gears 37 and rotating the latter simultaneously to initial position. This initial position is determined by an opening in one of the cylinders, (see Fig. 6), into which a plunger 109 is projected, said plunger being carried in the spider 26 and provided with a spring 110 whereby it is normally held withdrawn but is projected outwardly shortly after the operator depresses the notching button, said operation permitting the starting button 49 to return to its left hand position, thereby moving the link 67 to the left and causing the plunger 69 to engage the spider and eventually press against the plunger 109. In the operation of this stop-pin or plunger 109, if the co-operating opening in the end of the roller 31 is not in alignment with this plunger when the stop pin 70 arrests the reel in its zero position, then the spring 71 will simply press the plunger 109 against the head of the roller until the opening of the roller comes opposite the plunger; when this occurs the plunger 109 will move into the opening and arrest the roller in its zero position.

The parts are enclosed in a casing 111 having a sight opening in the top closed by a piece of glass 112. Beneath the glass is a chart 113 giving various prices per yard in suitable figures. Through this glass the operator observes not only the total computed price of the goods, but the length thereof on the indicator 32, the reading being taken opposite the arrow shown in Fig. 1. The portion of the casing over the measuring rollers is also transparent, a piece of glass 114 being provided through which the operator may inspect the rollers and notice when threads or ravellings become wound thereon. The side of the casing has a semi-circular housing 115 secured thereto to give a finished appearance to the opening through which the starting button 49 projects.

In using the machine the operator places the cloth to be measured between the rollers, which at the time are separated, holding one end of the cloth with his right hand and pressing the starting button 49 inwardly, thereby bringing the rollers together, after which the cloth is drawn between the rollers, the rotary motion being imparted from the lower roller through the reduction gearing 17 and 25 to the spider, thereby moving the indicating cylinders in a circular path as well as rotating them as they revolve. After the desired amount of cloth has been run through the machine, the operator depresses the notching button 59, thereby cutting the edge of the fabric and simultaneously raising the upper roller to release the goods and disengage the driving clutch. After the length and price readings have been noted, the operator resets the chart cylinders to zero position by depressing the resetting lever 83, rotating the sun and planet gears in the manner previously described. The machine is now ready for the next operation.

The term "reel," as used hereafter and in the claims, has been adopted, in the interest of brevity, to designate the carrier for the rotary indicators, comprising the shaft 28 and the spiders 26 and 27.

With the mechanism described it will be seen that the machine may be operated continuously in one direction when measuring an unusually long piece of goods, and that the parts may be restored to initial position instantaneously by a single operation during which said parts move only a small distance as compared with the total movement made during the measuring operation. By arranging the price indicating charts in cylindrical form in a planetary system a large superficial chart area is passed before the operator without requiring a machine of extremely large size. Various other advantages will be apparent without specific enumeration. In the present machine the rotary indicators 31 are rotated by rolling them along a controlling member in the form of a circular rack or sun gear 38. It will be seen, however, that said rack need not necessarily be circular and that the indicating rolls may be rotated by moving said rack, said rolls being held stationary during such movement or both may move, providing the necessary relative movement.

The resetting lever 83 should be held down a slight distance until the reel and rotary indicators have returned to zero.

It will thus be seen that the invention is not limited to the embodiment thereof herein shown and described as various other embodiments thereof are contemplated which fall within the scope of the appended claims.

I claim as my invention:
1. In a continuous measuring machine, the combination of a frame, a measuring roller supported thereby, a reel mounted so as to rotate without limit, a plurality of rotary indicators rotatably mounted on the reel, means for rotating the reel by the measuring roller, means for rotating the rotary indicators when the reel rotates, length indicating scales carried by the rotary indicators each having numbers for indicating the amount measured in units and fractions of the unit of measure, and a casing having a reading point at which the numbers on the scales are presented in succession so that in a measuring position of the reel the rotary indicator opposite the reading point will indicate the length measured.

2. In a continuous measuring machine, the combination of a frame, a measuring roller supported thereby, a reel mounted so as to rotate without limit, a plurality of rotary indicators rotatably mounted on the reel, means for rotating the reel by the measuring roller, means for rotating the rotary indicators when the reel rotates, length indicating scales carried by the rotary indicators each having numbers for indicating the amount measured in units and fractions of the unit of measure, a casing having a reading point at which the numbers on the scales are presented in succession so that in a measuring position of the reel the rotary indicator opposite the reading point will indicate the length measured, a presser roller co-operating with the measuring roller, and means automatically controlled thereby for stopping the reel in the zero position of the indicators.

3. In a continuous measuring machine, the combination of a frame, a measuring roller supported thereby, a reel mounted so as to rotate without limit, a plurality of rotary indicators rotatably mounted on the reel, means for rotating the reel by the measuring roller, means for rotating the rotary indicators when the reel rotates, length indicating scales carried by the rotary indicators each having numbers for indicating the amount measured in units and fractions of the unit of measure, a casing having a reading point at which the numbers on the scales are presented in succession so that in a measuring position of the reel the rotary indicator opposite the reading point will indicate the length measured, a hand-actuated member, means co-operating therewith to return the reel to its zero position, and means for stopping the reel in its zero position.

4. In a continuous measuring machine, the combination of a frame, a measuring roller supported thereby, a reel mounted so as to rotate without limit, a plurality of rotary indicators rotatably mounted on the reel, means for rotating the reel by the measuring roller, means for rotating the rotary indicators when the reel rotates, length indicating scales carried by the rotary indicators each having numbers for indicating the amount measured in units and fractions of the unit of measure, a casing having a reading point at which the numbers on the scales are presented in succession so that in a measuring position of the reel the rotary indicator opposite the reading point will indicate the length measured, a hand lever, means co-operating therewith to rotate the reel toward its zero position and automatic means for stopping the reel in its zero position.

5. In a measuring machine, the combination of a frame, a measuring roller supported thereby, a reel having a length indicating scale, a plurality of rotary indicators rotatably mounted on the reel, means for rotating the reel by the measuring roller, means for rotating the rotary indicators when the reel rotates, length indicating scales carried by the rotary indicators, each having numbers for indicating the total number of revolutions of the reel, and a casing having a reading point at which the numbers on the scales are presented in succession so that in any measuring position of the reel the rotary indicator opposite the reading point will indicate the total number of revolutions that have been made by the reel.

6. In a measuring machine, the combination of a frame, a measuring roller supported thereby, a reel having a length indicating scale, a plurality of rotary indicators rotatably mounted on the reel, means for rotating the reel by the measuring roller, means for rotating the rotary indicators when the reel rotates, length indicating scales carried by the rotary indicators each having numbers for indicating the number of complete revolutions the reel has made in the measuring movement and for indicating fractional rotation of the reel, and a casing having a reading point at which the numbers on the scales are presented in succession so that in any measuring position of the reel the rotary indicator opposite the reading point will indicate the total number of revolutions and fractions thereof that have been made by the reel.

7. In a measuring machine, the combination of a frame, a measuring roller supported thereby, a rotatably mounted reel, a plurality of rotary indicator rollers rotatably mounted on the reel, means including a clutch for rotating the reel by the measuring roller, means for rotating the indicator rollers when the reel rotates, a casing, a fixed scale carried thereby, length indicating scales carried by the indicator rollers each having numbers for indicating the amount measured in units and fractions of the unit of measure and carrying computed numbers indicating the charges to be made for the amount measured at the prices per yard indicated upon the fixed scale, said reel and indicating rollers operating to present the computed figures in succession opposite the fixed scale so that in a measuring position of the reel the indicator roller opposite the fixed scale will indicate the length measured and the charge to be made therefor at the different prices per yard indicated by the fixed scale, a presser roller to co-operate with the measuring roller, means for raising the presser roller, a clutch through which the measuring roller drives the reel, automatic means for opening the clutch when the presser roller is raised, and means for returning the reel and indicator rollers to their zero position.

8. In a measuring machine, the combination of a frame, a measuring roller supported thereby, a rotatably mounted reel, a plurality of rotary indicators rotatably mounted on the reel, means including a clutch for rotating the reel by the measuring roller, means for rotating the rotary indicators when the reel rotates, a fixed scale carrying numbers indicating different price rates for the unit of measure, said rotary indicators having computed figures co-operating with the fixed scale to indicate the charge to be made for the amount measured, means for opening the clutch to permit the independent rotation of the reel, means for rotating the reel to bring the same to the zero position when the clutch is open, and automatic means for stopping the reel in its zero position.

9. In a measuring machine, the combination of a frame, a measuring roller supported thereby, a rotatably mounted reel, a plurality of rotary indicators rotatably mounted on the reel, means for driving the reel from the measuring roller, means for rotating the rotary indicators when the reel rotates, said rotary indicators carrying computed figures which are functions of the length measured, a presser roller co-operating with the measuring roller, a movable frame carrying the same, for holding the presser roller against or away from the measuring roller, a stop controlled automatically with the presser roller frame and operating to permit continuous free rotation of the reel when the presser roller is held away from the measuring roller, said reel having means to co-operate with the stop to arrest the reel in the zero position when the presser roller frame is in a position to hold the presser roller against the measuring roller.

10. In a measuring machine, the combination of a frame, a measuring roller supported thereby, a rotatably mounted reel, a plurality of rotary indicators rotatably mounted on the reel, means for driving the reel from the measuring roller, means for rotating the rotary indicators when the reel rotates, said rotary indicators having computed figures which are functions of the length measured, a movable presser roller frame, a presser roller carried thereby to co-operate with the measuring roller, a latch for holding the presser roller frame up to hold the presser roller away from the measuring roller, a stop device held by the said latch in a withdrawn position to permit continuous free rotation of the reel when the presser roller is against the measuring roller during the measuring movement, and held by the latch in an advanced position when the presser roller is raised, said reel having means to co-operate with the stop and arrest the same automatically at the zero position of the reel when the presser roller frame is in its raised position.

11. In a measuring machine, the combination of a frame, a measuring roller supported thereby, a rotatably mounted reel, a plurality of rotary indicators rotatably mounted on the reel, means for driving the reel from the measuring roller, means for rotating the rotary indicators when the reel rotates, said rotary indicators having computed figures which are functions of the length measured, a movable presser roller frame, a presser roller carried thereby to co-operate with the measuring roller, a latch for holding the presser roller frame up to hold the presser roller away from the measuring roller, a stop device held by the said latch in a withdrawn position to permit continuous free rotation of the reel when the presser roller is against the measuring roller during the measuring movement, and held by the latch in an advanced position when the presser roller is raised, said reel having means to co-operate with the stop and arrest the same automatically at the zero position of the reel when the presser roller frame is in its raised position, and means for engaging one of the rotary indicators in the zero position of the reel to lock the rotary indicator against rotation on its own axis.

12. In a measuring machine, the combination of a frame, a measuring roller supported thereby, a rotatably mounted reel, a plurality of rotary indicators rotatably mounted on the reel, means including a clutch for rotating the reel by the measuring roller, planetary pinions carried by the rotary indicators, a normally stationary sun gear meshing with the pinions for rotating the rotary indicators when the reel rotates, a fixed scale carrying numbers indicating different price rates for the unit of measure, said rotary price scale having computed figures co-operating with the fixed scale to indicate the charge to be made for amount measured, means for opening the clutch to permit the independent rotation of the reel, means for rotating the reel to bring the same to its zero position, detent means and means for actuating the same to release the sun gear to permit the same to rotate with the reel when the reel returns to its zero position, means for rotating the sun gear to bring the rotary indicators back to their zero position, and automatic stop means operating to stop the reel in its zero position and rotary indicators in their zero position.

13. In a measuring machine, the combination of a frame, a measuring roller supported thereby, a rotatably mounted reel, a plurality of rotary indicators rotatably mounted on the reel, means including a clutch for driving the reel from the measuring roller, means for rotating the rotary indicators when the reel rotates, said rotary indicators having computed figures which are functions of the length measured, a movable presser roller frame, a presser roller carried thereby to co-operate with the measuring roller, a latch for holding the presser roller frame up to hold the presser roller away from the measuring roller, a stop device controlled by said latch and operating to permit continuous free rotation of the reel when the presser roller frame is down and the presser roller held against the measuring roller, as in the measuring movement, said latch operating to hold the stop in an advanced position when the presser roller is raised, and automatic means for opening the clutch when the presser roller frame is raised, thereby permitting the independent rotation of the reel, said reel having means to co-operate with the stop and arrest the same automatically at the zero position of the reel.

In testimony whereof, I have subscribed my name.

DOUGLAS TURNER.